United States Patent
Chen et al.

(10) Patent No.: US 12,554,316 B2
(45) Date of Patent: Feb. 17, 2026

(54) AVS SYSTEM, METHOD AND APPARATUS, AND DEVICE AND STORAGE MEDIUM

(71) Applicant: Suzhou Metabrain Intelligent Technology Co., Ltd., Jiangsu (CN)

(72) Inventors: Zhankui Chen, Jiangsu (CN); Wei Han, Jiangsu (CN); Guangying Xue, Jiangsu (CN)

(73) Assignee: Suzhou Metabrain Intelligent Technology Co., Ltd., Jiangsu (CN)

( * ) Notice: Subject to any disclaimer, the term of this patent is extended or adjusted under 35 U.S.C. 154(b) by 137 days.

(21) Appl. No.: 18/570,887

(22) PCT Filed: Mar. 29, 2022

(86) PCT No.: PCT/CN2022/083575
§ 371 (c)(1),
(2) Date: Dec. 15, 2023

(87) PCT Pub. No.: WO2023/082531
PCT Pub. Date: May 19, 2023

(65) Prior Publication Data
US 2024/0281050 A1    Aug. 22, 2024

(30) Foreign Application Priority Data
Nov. 12, 2021   (CN) .......................... 202111336001.X (51) Int. Cl.
*G06F 1/3296*   (2019.01)
*G06F 1/3228*   (2019.01)

(52) U.S. Cl.
CPC .......... *G06F 1/3296* (2013.01); *G06F 1/3228* (2013.01)

(58) Field of Classification Search
CPC .............................. G06F 1/3228; G06F 1/3296
See application file for complete search history.

(56) References Cited

U.S. PATENT DOCUMENTS

2010/0138684 A1*  6/2010  Kim ...................... G06F 1/3225
                                                          713/600
2016/0246343 A1*  8/2016  Pagarkar ............... G06F 1/3243
(Continued)

FOREIGN PATENT DOCUMENTS

CN      103984394 A     8/2014
CN      106357563 A     1/2017
(Continued)

OTHER PUBLICATIONS

Corresponding International Patent Application No. PCT/CN/2022/083575, International Search Report, date mailed Jul. 29, 2022.
(Continued)

*Primary Examiner* — Terrell S Johnson
(74) *Attorney, Agent, or Firm* — Cooper Legal Group, LLC (57) ABSTRACT

An Adaptive Voltage Scaling (AVS) system, method and apparatus, and a device. The system includes at least two controllers, a switching module, and a control object. The switching module is connected to the controllers through a bus, an output end of the switching module is connected to an input end of the control object, and the switching module scales the control object through AVS; and the switching module scales the occupied state of the bus through a selected controller, whereby the selected controller scales the control object through the bus.

17 Claims, 6 Drawing Sheets

(56) References Cited

U.S. PATENT DOCUMENTS

2016/0277020 A1* 9/2016 Marschalkowski ... H02M 3/157
2018/0039324 A1* 2/2018 Lee ..................... G06F 1/324

FOREIGN PATENT DOCUMENTS

| CN | 111835662 A | 10/2020 |
|----|-------------|---------|
| CN | 111866611 A | 10/2020 |
| CN | 111984471 A | 11/2020 |
| CN | 112015600 A | 12/2020 |
| CN | 112015689 A | 12/2020 |
| CN | 112764699 A | 5/2021 |
| CN | 113778930 A | 12/2021 |
| JP | 2016181168 A | 10/2016 |

OTHER PUBLICATIONS

Corresponding International Patent Application No. PCT/CN/2022/083575, Written Opinion, date mailed Jul. 29, 2022.
Corresponding Chinese Patent Application No. CN202111336001.X, First Office Action, dated Dec. 22, 2021.
Corresponding Chinese Patent Application No. CN202111336001.X, Notification of Grant, dated Jan. 20, 2022.

* cited by examiner

AVS SYSTEM, METHOD AND APPARATUS, AND DEVICE AND STORAGE MEDIUM

CROSS-REFERENCE TO RELATED APPLICATION

This application is the national phase application of International Application No. PCT/CN2022/083575, filed Mar. 29, 2022, which claims priority to Chinese Patent Application No. 202111336001.X, filed with China National Intellectual Property Administration on Nov. 12, 2021 and entitled "AVS SYSTEM, METHOD AND APPARATUS, AND DEVICE". The contents of International Application No. PCT/CN2022/083575 and Chinese Patent Application No. 202111336001.X are incorporated herein by reference in their entireties.

FIELD

The present application relates to the technical field of power control, and in particular, to an Adaptive Voltage Scaling (AVS) system, method and apparatus, and a device and a storage medium.

BACKGROUND

With the development of power technology, high current power management chips that support a parallel VR11 (parallel power management bus proposed by Intel) protocol have gradually been phased out, and the latest ones are those that support a Power Management Bus (PMBUS) protocol. The existing switch module management technology is that a controller is connected to an output end of a switch module through the VR11, an output end of the controller is connected to a power module, and an output end of the power module is connected to the switch module, and then scaling and control of the controller on the switch module are realized. However, since the switch module does not update and iterate as quickly as the power module, and the chip of the switch module that supports the VR11 is still widely used. Thus, the power module and the switch module support different protocols and cannot be directly interconnected. In this case, protocol conversion needs to be performed.

In addition to a Central Processing Unit (CPU) in a controller of a white-box switch and a server, usually, there is also a low-cost Baseboard Management Controller (BMC) chip for management. However, the needs of different customers are not entirely the same. Some customers need a CPU to serve as a controller for power management, some customers need the BMC to serve as the controller for the power management, and some customers may have different needs in different scenarios.

The most important of all power is undoubtedly the kernel power of the switch module, which not only has high current but also has high requirements on ripple noise, so the management of this power is particularly important. Meanwhile, the required kernel voltage may also be different due to individual differences between processes of chips of the switch module. The chip of the switch module is added with an AVS interface that supports the VR11 protocol, and may be directly interconnected with a power module that supports the VR11 to configure an output of the power as a voltage that matches the chip of the switch module to reduce the power consumption of a chip of a target terminal.

Taking the above points into consideration, protocol conversion needs to be considered during designing, switching between two controllers also needs to be considered, and meanwhile, the monitoring of the kernel power of the switch module needs to be considered. These bring great difficulties to the design, and choosing an old model switch module that supports the VR11 may face supply risks such as production suspension. Therefore, an AVS system that supports multi-controller switching is needed to improve this situation.

SUMMARY

In view of this, embodiments of the present application provide an AVS system, method and apparatus, and a device, aiming to solve the problems about protocol conversion inside a control object and flexible switching of a controller on control object scaling.

According to a first aspect, an embodiment of the present application provides an AVS system, which includes at least two controllers, a switching module, and a control object.

The switching module is connected to the controllers through a bus. An output end of the switching module is connected to an input end of the control object. The switching module scales the control object through AVS.

The switching module scales the occupied state of the bus through a selected controller, and then the selected controller scales the control object through the bus.

According to the AVS system provided by the embodiment of the present application, the switching module may select a controller according to actual needs, and the switching module may determine the state of the bus. When the state of the bus is a busy state, it indicates that a controller has already scaled the control object. When the state of the bus is an idle state, the switching module connects the selected controller and the bus, then the selected controller may realize the control on the control object, and flexible application of various controllers may be realized.

In combination with the first aspect, in a first implementation of the first aspect, the switching module includes a processor and a switching circuit.

An input end of the processor is connected to an output end of the controller. An output end of the processor is connected to an input end of the switching circuit. An output end of the switching circuit is connected to the input end of the control object. The processor is configured to read and store a target value of the control object and a state of the bus. The switching circuit is configured to switch different controllers to connect the bus.

According to the AVS system provided by the embodiment of the present application, when enabled, the processor reads and stores a target value of the control object, then the controller will read the target value stored in the processor, and then will read the state of the bus acquired from the processor. When the state of the bus is idle, the switching circuit switches a circuit of the bus to connect the controller, and then the controller may scale the control object to reach the target value, which might realize flexible switching of the controller to scale the control object.

In combination with a first implementation of the first aspect, in a second implementation of the first aspect, the control object includes a power module and a switch module. An input end of the power module is connected to the output end of the switching circuit. An output end of the power module is connected to an input end of the switch module. An output end of the switch module is connected to the input end of the processor. The power module is configured to supply power to the switch module.

According to the AVS system provided by the embodiment of the present application, the switch module is connected to the processor through a parallel power management bus, and the power module is connected to the switching circuit through the power management bus, which might solve the problem of unbalance development of the switch module and the power module. The switch module that supports the parallel power management bus is still widely used. Thus, the switch module and the power module cannot be directly interconnected due to different protocols. In this case, protocol conversion needs to be performed. Therefore, the processor may achieve an effect of protocol conversion.

In combination with the first implementation of the first aspect, in a third implementation of the first aspect, the controller includes a Baseboard Management Controller (BMC) and a Central Processing Unit (CPU): an output end of the BMC is connected to the input end of the processor: an output end of the CPU is connected to an input end of a Field Programmable Gate Array (FPGA) through Peripheral Component Interconnect Express (PCIE); and an output end of the FPGA is connected to the input end of the processor.

According to the AVS system provided by the embodiment of the present disclosure, a plurality of requirements of a customer for the controllers are met, and economic benefits are brought.

According to a second aspect, an embodiment of the present application further provides an AVS method. The method is applied to the AVS system, and includes:
　　acquiring a target controller and a state of a bus, and switching to the target controller for scaling in a case that the state of the bus is an idle state;
　　acquiring a target value of a control object; and
　　scaling, by the target controller, the control object on the basis of the target value of the control object.

According to the AVS method provided by the embodiment of the present application, a controller may be selected according to actual needs, and the state of the bus may be determined. When the state of the bus is a busy state, it indicates that a controller has already scaled the control object. When the state of the bus is an idle state, the selected controller is connected to the bus, then the selected controller may realize the control on the control object, and flexible application of various controllers may be realized.

In combination with the second aspect, in a first implementation of the second aspect, after the acquiring a target controller and a state of a bus, and switching to the target controller for scaling in a case that the state of the bus is an idle state, the method further includes:
　　setting the state of the bus from the idle state to an occupied state.

According to the AVS method provided by the embodiment of the present application, the state of the bus is set from the idle state to the occupied state, which indicates that the bus has been occupied, and the other controllers do not have authority to operate the bus.

In combination with the second aspect, in a second implementation of the second aspect, in the scaling, by the target controller, the control object on the basis of the target value of the control object, the method includes:
　　a control object including a power module and a switch module;
　　feeding, by the switch module, an actual value back to the power module; and
　　scaling, by the target controller, the switch module through the actual value received by reading the power module.

According to the AVS method provided by the embodiment of the present disclosure, the switch module feeds the actual value back to the power module. The actual value of the switch module may be observed in real time. When the actual value does not match the target value, the target controller transmits a scaling instruction to the power module timely, and then the power module controls the switch module to reduce the power consumption of the switch module.

In combination with the first implementation of the second aspect, in a third implementation of the second aspect, in the acquiring a target controller and a state of a bus, and switching to the target controller for scaling in a case that the state of the bus is an idle state, the method further includes:
　　transmitting, by the target controller, a switching instruction to the switching module; and
　　switching, by the switching module, the bus to connect the target controller.

According to the AVS method provided by the embodiment of the present application, the switching module may process the occupied state of the bus according to the received switching instruction, connect the bus to the target controller, and change the state of the bus into the occupied state. Other controllers do not have authority to operate the bus.

According to a third aspect, an embodiment of the present application further provides an AVS apparatus, including:
　　a first acquisition unit, configured to acquire a target controller and a state of a bus, and switch to the target controller for scaling in a case that the state of the bus is an idle state;
　　a second acquisition unit, configured to acquire a target value of a control object; and
　　a scaling unit, configured to scale, by the target controller, the control object on the basis of the target value of the control object.

According to the AVS apparatus provided by the embodiment of the present application, a controller may be selected according to actual needs, and the state of the bus may be determined. When the state of the bus is a busy state, it indicates that a controller has already scaled the control object. When the state of the bus is an idle state, the selected controller is connected to the bus, then the selected controller may realize the control on the control object, and flexible application of various controllers may be realized.

In combination with the third aspect, in a first implementation of the third aspect, the apparatus further includes:
　　a state scaling unit, configured to set the state of the bus from the idle state to an occupied state.

In combination with the first implementation of the third aspect, in a second implementation of the third aspect, the scaling unit includes:
　　a control object including a power module and a switch module;
　　a feedback unit, configured to feed, by the switch module, an actual value back to the power module; and
　　a scaling subunit, configured to scale, by the target controller, the switch module through the actual value received by reading the power module.

In combination with the first implementation of the third aspect, in a third implementation of the third aspect, the first acquisition unit includes:
　　a transmitting unit, configured to transmit, by the target controller, a switching instruction to the switching module; and
　　a switching unit, configured to switch, by the switching module, the bus to connect the target controller.

In combination with the third aspect, in a fourth implementation of the third aspect, the apparatus is applied to the AVS system according to the first aspect or any implementation of the first aspect.

According to a fourth aspect, an embodiment of the present application provides an electronic device, including a memory and a processor. The memory is in communication connection with the processor. The memory stores a computer instruction, and the processor performs the AVS method according to the second aspect and any implementation of the second aspect by executing the computer instruction.

According to a fifth aspect, an embodiment of the present application provides a computer storage medium. The computer storage medium stores a computer-executable instruction. The computer-executable instruction implements step of the AVS method according to the second aspect or any implementation of the second aspect when executed by the processor.

BRIEF DESCRIPTION OF THE DRAWINGS

To describe the technical solutions in the specific implementation manners of the present application or in the prior art more clearly, the following briefly describes the accompanying drawings required for describing the specific implementation manners or the prior art. Apparently, the accompanying drawings in the following description show merely some implementation manners of the present application, and a person of ordinary skill in the art may still derive other drawings from these accompanying drawings without creative efforts.

DETAILED DESCRIPTION

To make the objectives, technical solutions, and advantages of the embodiments of the present application clearer, the following clearly and completely describes the technical solutions in the embodiments of the present application with reference to the accompanying drawings in the embodiments of the present application. Apparently, the described embodiments are part rather than all of the embodiments of the present application. All other embodiments obtained by those of ordinary skill in the art based on the embodiments of the present application without creative efforts shall fall within the protection scope of the present application.

It is to be noted that an execution subject of the AVS method provided by an embodiment of the present application may be an AVS apparatus. The AVS apparatus may be implemented as part or all of a computer device in a manner of software, hardware, or a combination of software and hardware. The computer device may be a server or a terminal. The server in the embodiment of the present application may be one server, or a server cluster consisting of a plurality of servers. The terminal in the embodiment of the present application may be other intelligent hardware devices such as a smartphone, a personal computer, a tablet, a wearable device, and an intelligent robot. The following method embodiments are all described by taking an example in which the execution subject is an electronic device.

Figure 1:
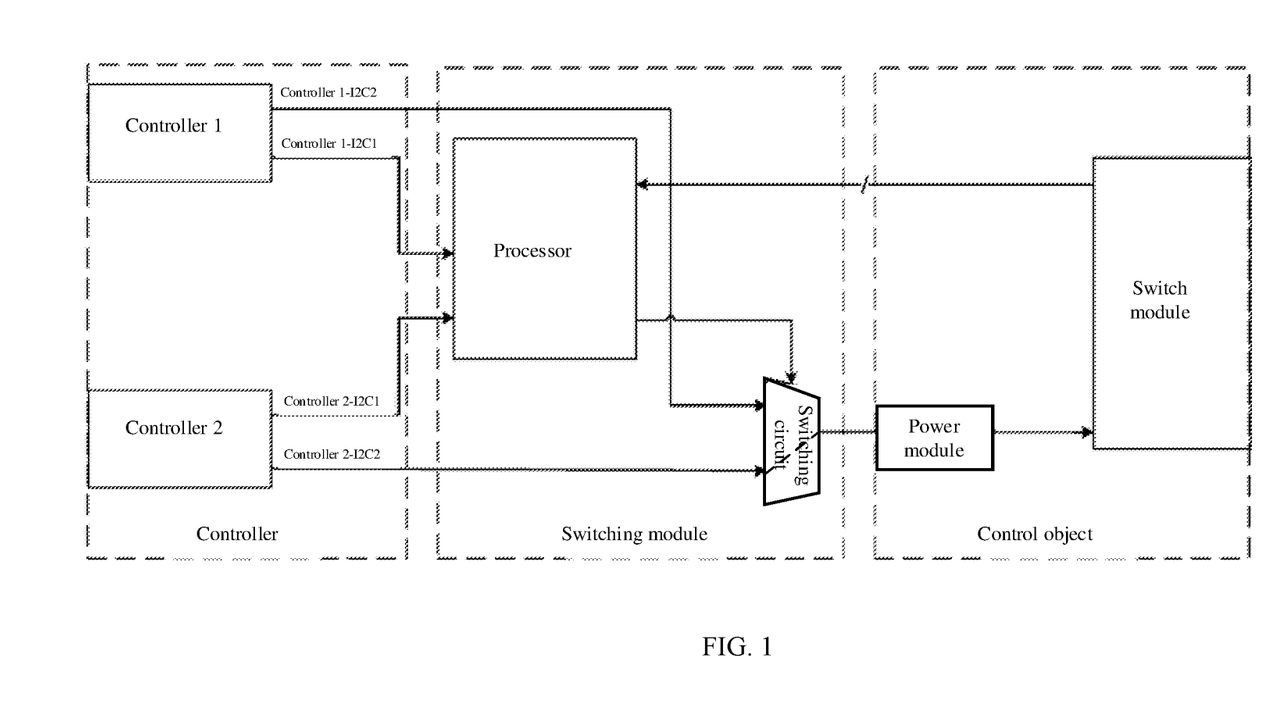
FIG. 1 is a diagram of an apparatus applying an AVS system provided by an embodiment of the present application.

In some embodiments of the present application, as shown in FIG. 1, an AVS system is provided, which includes at least two controllers, a switching module, and a control object.

The switching module is connected to the controllers through a bus. An output end of the switching module is connected to an input end of the control object. The switching module scales the control object through AVS.

The switching module scales the occupied state of the bus through a selected controller, and then the selected controller scales the control object through the bus.

The AVS system provided by the embodiments of the present application is described by using two controllers, respectively a controller 1 and a controller 2. The number of the controllers is not specifically limited. The controllers may be selected according to actual needs. The bus is an I2C bus, which is not limited here. The switching module may select the controllers according to actual needs, and the switching module may determine the state of the bus. When the state of the bus is a busy state, it indicates that a controller has already scaled the control object. When the state of the bus is an idle state, the switching module connects the selected controller and the bus, then the selected controller may realize the control on the control object, and flexible application of various controllers may be realized.

In an optional embodiment of the present application, as shown in FIG. 1, the switching module includes a processor and a switching circuit.

An input end of the processor is connected to an output end of the controller. An output end of the processor is connected to an input end of the switching circuit. An output end of the switching circuit is connected to the input end of the control object. The processor is configured to read and store a target value of the control object and a state of the bus. The switching circuit is configured to switch different controllers to connect the bus.

According to the AVS system provided by the embodiment of the present application, when enabled, the processor reads and stores a target value of the control object, then the controller will read the target value stored in the processor, and then will read the state of the bus acquired from the processor. When the state of the bus is idle, the two controllers drive the switching circuit simultaneously, and the switching circuit switches a circuit of the bus to connect the controller, and then the controller may scale the control object to reach the target value, which might realize flexible switching of the controller to scale the control object. In the present embodiment, the switching circuit switches the circuit by using an I2C Master switching circuit. In other embodiments, the controller may also be connected to the control object in a software manner.

In an optional embodiment of the present application, as shown in FIG. 1, the control object includes a power module and a switch module. An input end of the power module is connected to the output end of the switching circuit. An output end of the power module is connected to an input end of the switch module. An output end of the switch module is connected to the input end of the processor. The power module is configured to supply power to the switch module.

In the present embodiment, the power module is a Voltage Adjustment (VR) chip, and the switch module is a Switch IC.

According to the AVS system provided by the embodiment of the present application, the switch module is connected to the processor through a parallel power management bus, and the power module is connected to the switching circuit through the power management bus, which might solve the problem of unbalance development of the switch module and the power module. The switch module that supports the parallel power management bus is still widely used. Thus, the switch module and the power module cannot be directly interconnected due to different protocols. In this case, protocol conversion needs to be performed. Therefore, the processor may achieve an effect of protocol conversion.

Figure 2:
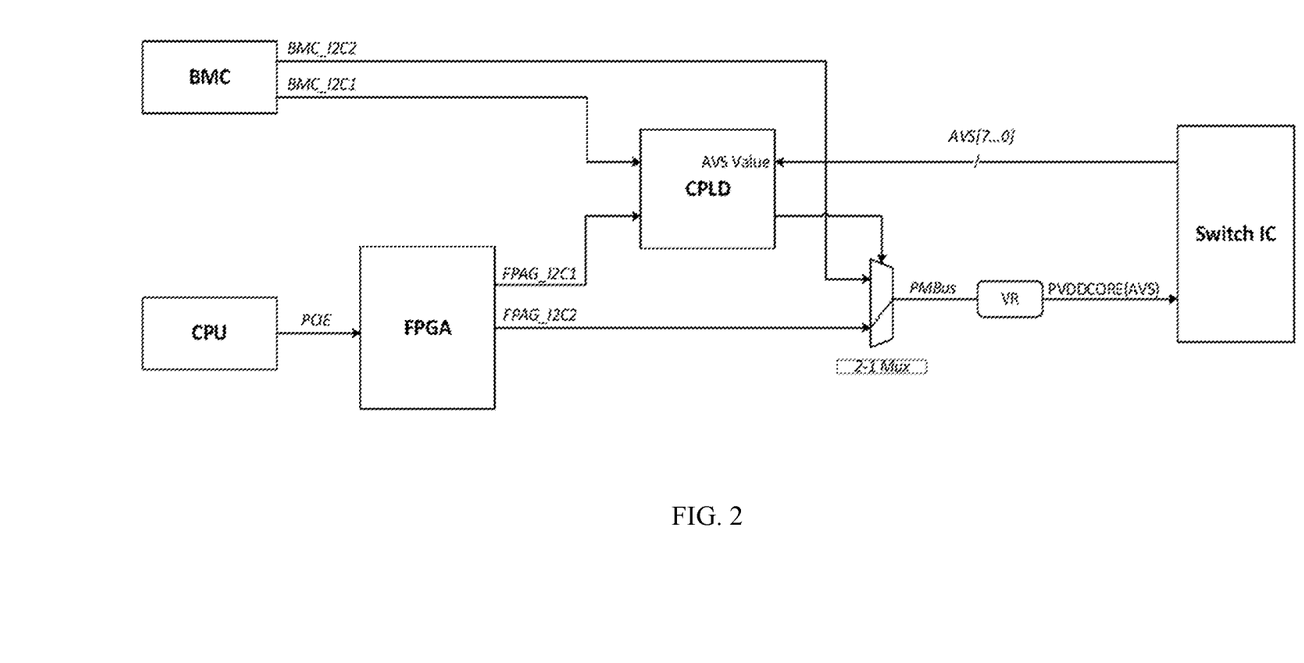
FIG. 2 is a diagram of an apparatus of an AVS system provided by another embodiment of the present application.

In an optional embodiment of the present application, as shown in FIG. 2, the controller includes a BMC and a CPU; an output end of the BMC is connected to the input end of the processor; an output end of the CPU is connected to an input end of an FPGA through PCIE; and an output end of the FPGA is connected to the input end of the processor.

According to the AVS system provided by the embodiment of the present disclosure, the processor adopts a Complex Programmable Logic Device (CPLD), and a data reading and storing function is written in a program through program writing, which meets a plurality of requirements of a customer for the controllers, and brings economic benefits.

In some embodiments of the present application, as shown in FIG. 1, an AVS method is provided. Taking the method applied to an electronic device as an example for description, the method includes the following steps:

S100, a target controller and a state of a bus are acquired, and the target controller is switched for scaling in a case that the state of the bus is an idle state.

In the present embodiment, taking the target controller being a controller 1 as an example, the controller 1 reads the state of the bus. If the state is an occupied state, it indicates that control authority cannot be acquired, and a process is ended. If the state is an idle state, it indicates that the control authority might be acquired.

S200, a target value of a control object is acquired.

In the present embodiment, when in an enabled state, the control object has a target value, the target controller will read the target value of the control object, and then the controller will be drive to connect the bus.

S300, the target controller scales the control object on the basis of the target value of the control object.

According to the AVS method provided by the embodiment of the present application, a controller may be selected according to actual needs, and the state of the bus may be determined. When the state of the bus is a busy state, it indicates that a controller has already scaled the control object. When the state of the bus is an idle state, the selected controller is connected to the bus, then the selected controller may realize the control on the control object, and flexible application of various controllers may be realized.

Figure 3:
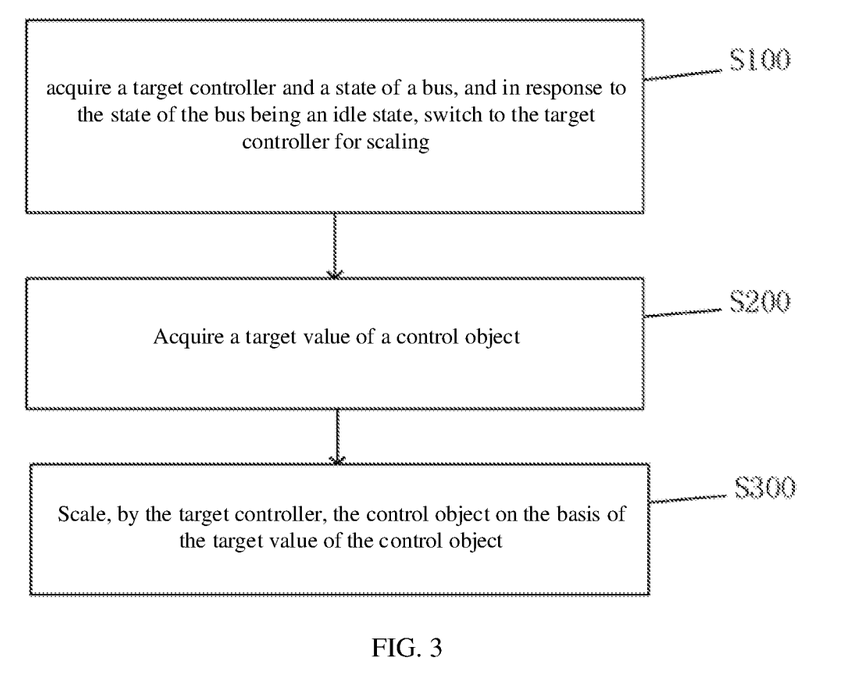
FIG. 3 is a schematic flowchart of an AVS method provided by an embodiment of the present application.

In an optional embodiment of the present application, as shown in FIG. 3, after the S100, "a target controller and a state of a bus are acquired, and the target controller is switched for scaling in a case that the state of the bus is an idle state" the method includes:

the state of the bus is set from the idle state to an occupied state.

According to the AVS method provided by the embodiment of the present application, the state of the bus is set from the idle state to the occupied state, which indicates that the bus has been occupied, and the other controllers do not have authority to operate the bus.

In the present embodiment, when the target controller completes the scaling of the control object, the state of the bus is driven to change from the occupied state to the idle state, and the process is ended, which facilitates next scaling of the controller on the control object.

In an optional embodiment of the present application, as shown in FIG. 3, the S300, "the target controller scales the control object on the basis of the target value of the control object", the method may include the following steps:

a control object includes a power module and a switch module;

(1) the switch module feeds an actual value back to the power module; and (2) the target controller scales the switch module through the actual value received by reading the power module.

According to the AVS method provided by the embodiment of the present disclosure, the switch module feeds the actual value back to the power module. The actual value of the switch module may be observed in real time. When the actual value does not match the target value, the target controller transmits a scaling instruction to the power module timely, and then the power module controls the switch module to reduce the power consumption of the switch module.

In an optional embodiment of the present application, as shown in FIG. 3, the "a target controller and a state of a bus are acquired, and the target controller is switched for scaling in a case that the state of the bus is an idle state" in S100, the method may include following steps:

(1) the target controller transmits a switching instruction to the switching module; and (2) the switching module switches the bus to connect the target controller.

According to the AVS method provided by the embodiment of the present application, the switching module may process the occupied state of the bus according to the received switching instruction, connect the bus to the target controller, and change the state of the bus into the occupied state. Other controllers do not have authority to operate the bus.

It is be understood that, although various steps in the flowchart of FIG. 3 are shown in order as indicated by the arrows, these steps are not necessarily executed sequentially in the order indicated by the arrows. Unless explicitly stated herein, there is no strict order restriction on the performing of these steps, and these steps may be performed in other orders. In addition, at least part of the steps in FIG. 3 may include a plurality of steps or a plurality of stages. These steps or stages are not necessarily completed at the same time, but may be executed at different times. These steps or stages are not necessarily executed in order, but may be executed in turn or alternately with other steps or at least part of the steps or stages of other steps.

Figure 4:
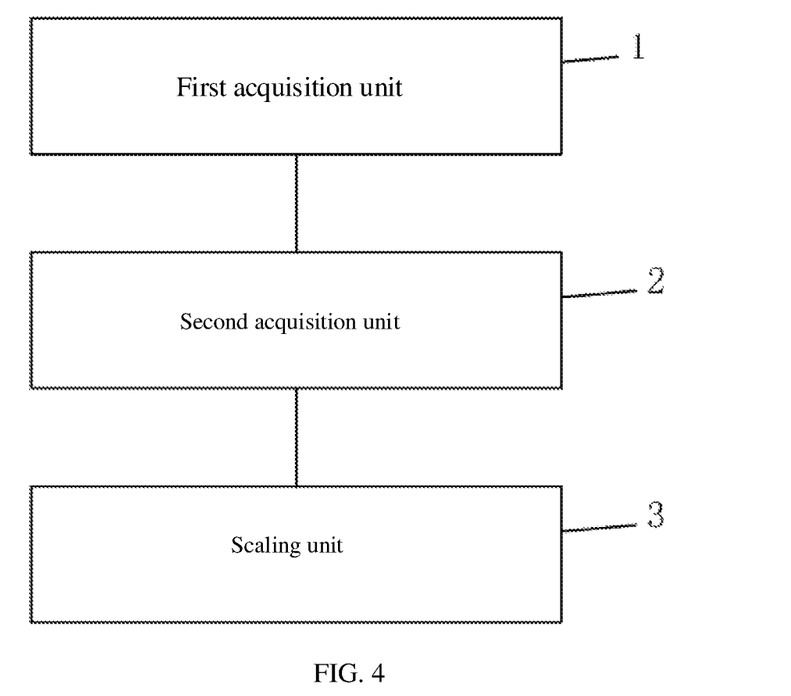
FIG. 4 is a diagram of functional modules applying the AVS apparatus provided by an embodiment of the present application.

As shown in FIG. 4, the embodiment of the present application further provides an AVS apparatus, including a first acquisition unit 1, a second acquisition unit 2, and a scaling unit 3.

The first acquisition unit 1 is configured to acquire a target controller and a state of a bus, and switch to the target controller for scaling in a case that the state of the bus is an idle state.

The second acquisition unit 2 is configured to acquire a target value of a control object.

The scaling unit 3 is configured to scale, by the target controller, the control object on the basis of the target value of the control object.

According to the AVS apparatus provided by the embodiment of the present application, a controller may be selected according to actual needs, and the state of the bus may be determined. When the state of the bus is a busy state, it indicates that a controller has already scaled the control object. When the state of the bus is an idle state, the selected controller is connected to the bus, then the selected controller may realize the control on the control object, and flexible application of various controllers may be realized.

In some embodiments of the present application, the apparatus further includes a state scaling unit.

The state scaling unit is configured to set the state of the bus from the idle state to an occupied state.

In some embodiments of the present application, the scaling unit specifically includes:
- a control object including a power module and a switch module;
- a feedback unit, configured to feed, by the switch module, an actual value back to the power module; and
- a scaling subunit, configured to scale, by the target controller, the switch module through the actual value received by reading the power module.

In some embodiments of the present application, the first acquisition unit includes:
- a transmitting unit, configured to transmit, by the target controller, a switching instruction to the switching module; and
- a switching unit, configured to switch, by the switching module, the bus to connect the target controller.

Specific limitations and beneficial effects of the AVS apparatus may refer to the limitations on the AVS method hereinabove, which will not be described in detail here. All or part various modules in the AVS apparatus may be implemented by software, hardware, or a combination of software and hardware. Each of the above modules may be embedded in or independent of a processor in an electronic device in a form of hardware, or may be stored in a memory in the electronic device in a form of software, whereby the processor invokes and performs operations corresponding to the above modules.

An embodiment of the present application further provides an electronic device, which has the AVS apparatus as shown in FIG. 4.

Figure 5:
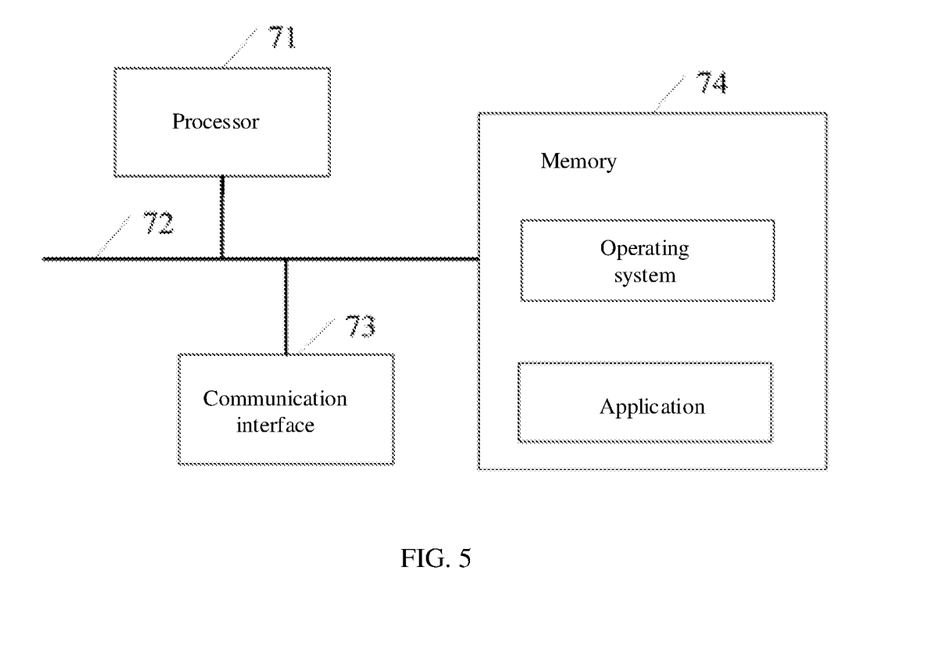
FIG. 5 is a schematic structural diagram of a hardware structure applying an electronic device provided by an embodiment of the present application.

As shown in FIG. 5, it is a schematic structural diagram of an electronic device provided by an optional embodiment of the present application. As shown in FIG. 5, the electronic device may include: at least one processor 71, for example, a CPU, at least one communication interface 73, a memory 74, and at least one communication bus 72. The communication bus 72 is configured to implement connection and communication between these components. The communication interface 73 may include a display and a keyboard, and in some embodiments, the communication interface 73 may further include a standard wired interface and a standard wireless interface. The memory 74 may be a high-speed Random Access Memory (RAM), or may be a non-volatile memory, for example, at least one magnetic disk memory. In some embodiments, the memory 74 may also be at least one storage apparatus that is located far away from the foregoing processor 71. The processor 71 may be combined with the AVS apparatus described in FIG. 4. The memory 74 stores an application. The processor 71 invokes program code stored in the memory 74 to perform any of the method steps.

The communication bus 72 may be a Peripheral Component Interconnect (PCI for short) bus or an Extended Industry Standard Architecture (EISA for short) bus, or the like. The communication bus 72 may be divided into an address bus, a data bus, a control bus, and the like. For ease of representation, the communication bus is only represented by a thick line in FIG. 5, but it does not mean that there is only one bus or one type of bus.

The memory 74 may include a volatile memory, for example, a Random-Access Memory (RAM for short). The memory may also include a non-volatile memory, for example, a flash memory, a Hard Disk Drive (HDD for short), or a Solid-State Drive (SSD for short). The memory 74 may also include a combination of the foregoing types of memories.

The processor 71 may be a CPU, a Network Processor (NP for short), or a combination of a CPU and an NP.

The processor 71 may further include a hardware chip. The hardware chip may be an Application-Specific Integrated Circuit (ASIC for short), a Programmable Logic Device (PLD for short), or a combination thereof. The PLD may be a CPLD, an FPGA, Generic Array Logic (GAL for short), or any combination thereof.

In some embodiments, the memory 74 is further configured to store a program instruction. The processor 71 may invoke the program instruction to implement the AVS method as shown in the embodiment of FIG. 3 of the present application.

Figure 6:
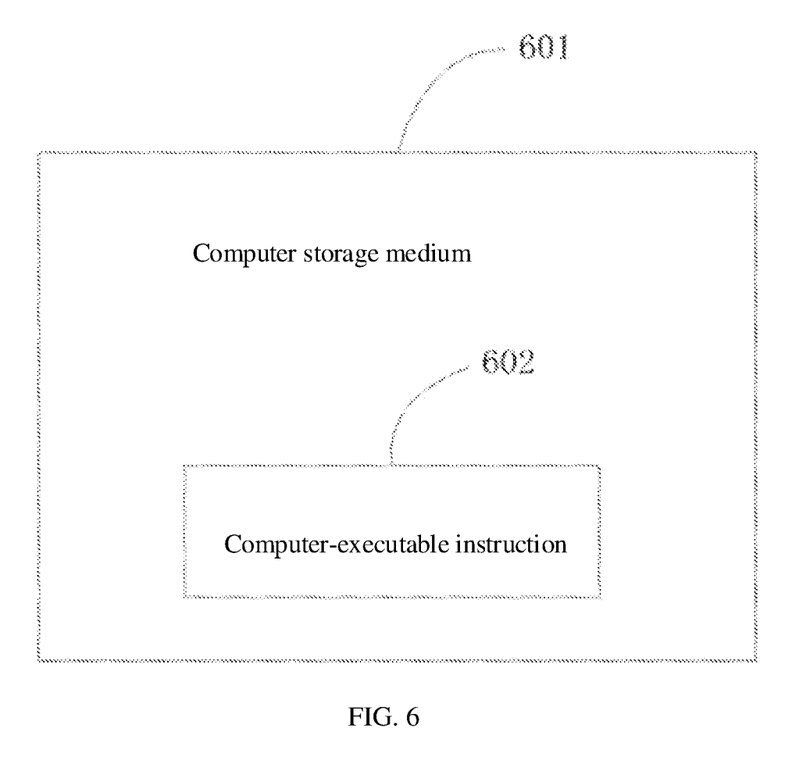
FIG. 6 is a schematic structural diagram of a storage medium provided by an embodiment of the present application.

An embodiment of the present application further provides a non-transient computer storage medium. FIG. 6 is a schematic structural diagram of the storage medium provided by the embodiment of the present application. As shown in FIG. 6, the computer storage medium 601 stores a computer-executable instruction 602. The computer-executable instruction 602 may perform the AVS method in any method embodiment. The storage medium may be a magnetic disk, a compact disk, a Read-Only Memory (ROM), a RAM, a flash memory, an HDD, or an SSD. The storage medium may also include a combination of the above types of memories.

Although embodiments of the present application are described in combination of accompanying drawings, those skilled in the art may make various modifications and variations without departing from the spirit and scope of the present application. Such modifications and variations all fall within the scope defined by the accompanying claims.

What is claimed is:

1. An Adaptive Voltage Scaling (AVS) system, comprising at least two controllers, a switching module, and a control object, wherein
    the switching module is connectable to the at least two controllers through a bus; an output end of the switching module is connected to an input end of the control object; the switching module scales the control object through AVS;
    the switching module scales an occupied state of the bus through a selected controller of the at least two controllers, whereby the selected controller scales the control object through the bus;
    the switching module comprises a processor and a switching circuit;
    an input end of the processor is connected to an output end of the at least two controllers; an output end of the processor is connected to an input end of the switching circuit;

an output end of the switching circuit is connected to the input end of the control object;

the processor is configured to read and store a target value of the control object and a state of the bus; and the switching circuit is configured to switch between different controllers of the at least two controllers to connect the bus.

2. The AVS system according to claim 1, wherein the control object comprises a power module and a switch module;

an input end of the power module is connected to the output end of the switching circuit;

an output end of the power module is connected to an input end of the switch module;

an output end of the switch module is connected to the input end of the processor; and the power module is configured to supply power to the switch module.

3. The AVS system according to claim 1, wherein each of the at least two controllers comprises a Baseboard Management Controller (BMC) and a Central Processing Unit (CPU);

an output end of the BMC is connected to the input end of the processor;

an output end of the CPU is connected to an input end of a Field Programmable Gate Array (FPGA) through Peripheral Component Interconnect Express (PCIE); and an output end of the FPGA is connected to the input end of the processor.

4. The AVS system according to claim 2, wherein the power module is configured as a voltage adjustment chip.

5. The AVS system according to claim 2, wherein the switch module is configured as a switch integrated circuit.

6. The AVS system according to claim 2, wherein the switch module is connected to the processor through a parallel power management bus;

the power module is connected to the switching circuit through a power management bus; and the processor is configured to convert a communication protocol between the power module and the switch module so as to enable the power module and the switch module to be interconnected.

7. An Adaptive Voltage Scaling (AVS) method, wherein the AVS method is applied to an AVS system, wherein the AVS system comprises at least two controllers, a switching module, and a control object;

the switching module is connectable to the at least two controllers through a bus; an output end of the switching module is connected to an input end of the control object; the switching module scales the control object through AVS;

the switching module scales an occupied state of the bus through a selected controller of the at least two controllers, whereby the selected controller scales the control object through the bus;

the switching module comprises a processor and a switching circuit;

an input end of the processor is connected to an output end of the at least two controllers; an output end of the processor is connected to an input end of the switching circuit;

an output end of the switching circuit is connected to the input end of the control object;

the processor is configured to read and store a target value of the control object and a state of the bus;

the switching circuit is configured to switch between different controllers of the at least two controllers to connect the bus; and the AVS method comprises:

acquiring a target controller and the state of the bus, and in response to the state of the bus being an idle state, switching to the target controller for scaling;

acquiring the target value of the control object; and scaling, by the target controller, the control object on a basis of the target value of the control object.

8. The AVS method according to claim 7, wherein after the acquiring the target controller and the state of the bus, and in response to the state of the bus being the idle state, switching to the target controller for scaling, the AVS method comprises:

setting the state of the bus from the idle state to the occupied state.

9. The AVS method according to claim 7, wherein the scaling, by the target controller, the control object on the basis of the target value of the control object, comprises:

the control object comprising a power module and a switch module;

feeding, by the switch module, an actual value back to the power module; and scaling, by the target controller, the switch module through the actual value received by reading the power module.

10. The AVS method according to claim 7, the acquiring the target controller and the state of the bus, and in response to the state of the bus being the idle state, switching to the target controller for scaling, comprises:

transmitting, by the target controller, a switching instruction to the switching module; and switching, by the switching module, the bus to connect the target controller.

11. The AVS method according to claim 7, wherein the control object comprises a power module and a switch module;

an input end of the power module is connected to the output end of the switching circuit;

an output end of the power module is connected to an input end of the switch module;

an output end of the switch module is connected to the input end of the processor; and the power module is configured to supply power to the switch module.

12. The AVS method according to claim 7, wherein each of the at least two controllers comprises a Baseboard Management Controller (BMC) and a Central Processing Unit (CPU);

an output end of the BMC is connected to the input end of the processor;

an output end of the CPU is connected to an input end of a Field Programmable Gate Array (FPGA) through Peripheral Component Interconnect Express (PCIE); and an output end of the FPGA is connected to the input end of the processor.

13. The AVS method according to claim 8, wherein the AVS method further comprises:

when the target controller completes the scaling of the control object, driving the state of the bus to change from the occupied state to the idle state.

14. An electronic device, comprising a memory and a processor, wherein the memory stores a computer instruction, and upon execution of the computer instruction, the processor is configured to implement an Adaptive Voltage Scaling (AVS) method, wherein the AVS method is applied to an AVS system;

the AVS system comprises at least two controllers, a switching module, and a control object;

the switching module is connectable to the at least two controllers through a bus; an output end of the switching module is connected to an input end of the control object; the switching module scales the control object through AVS;

the switching module scales an occupied state of the bus through a selected controller of the at least two controllers, whereby the selected controller scales the control object through the bus;

the switching module comprises the processor and a switching circuit;

an input end of the processor is connected to an output end of the at least two controllers; an output end of the processor is connected to an input end of the switching circuit;

an output end of the switching circuit is connected to the input end of the control object;

the processor is configured to read and store a target value of the control object and a state of the bus;

the switching circuit is configured to switch between different controllers of the at least two controllers to connect the bus; and the AVS method comprises:

acquiring a target controller and the state of the bus, and in response to the state of the bus being an idle state, switching to the target controller for scaling;

acquiring the target value of the control object; and scaling, by the target controller, the control object on a basis of the target value of the control object.

15. The electronic device according to claim 14, wherein upon execution of the computer instruction, the processor is further configured to:

set the state of the bus from the idle state to the occupied state.

16. The electronic device according to claim 14, wherein the control object comprises a power module and a switch module and upon execution of the computer instruction, the processor is further configured to:

feed, by the switch module, an actual value back to the power module; and scale, by the target controller, the switch module through the actual value received by reading the power module.

17. The electronic device according to claim 14, wherein upon execution of the computer instruction, the processor is further configured to:

transmit, by the target controller, a switching instruction to the switching module; and switch, by the switching module, the bus to connect the target controller.

* * * * *